US012581196B2

(12) United States Patent
Smithweck et al.

(10) Patent No.: US 12,581,196 B2
(45) Date of Patent: Mar. 17, 2026

(54) GUIDED REAL-TIME VEHICLE IMAGE ANALYZING DIGITAL CAMERA WITH AUTOMATIC PATTERN RECOGNITION AND ENHANCEMENT

(71) Applicants: Jay Smithweck, Odessa, FL (US);
Satya Prakash Mallick, San Diego, CA (US)

(72) Inventors: Jay Smithweck, Odessa, FL (US);
Satya Prakash Mallick, San Diego, CA (US)

(73) Assignee: Jay Smithweck, Odessa, FL (US)

( * ) Notice: Subject to any disclaimer, the term of this patent is extended or adjusted under 35 U.S.C. 154(b) by 91 days.

(21) Appl. No.: 18/312,469

(22) Filed: May 4, 2023

(65) Prior Publication Data
US 2023/0362492 A1 Nov. 9, 2023

Related U.S. Application Data

(60) Provisional application No. 63/500,190, filed on May 4, 2023, provisional application No. 63/364,250, filed on May 5, 2022.

(51) Int. Cl.
*H04N 23/698* (2023.01)
*G06T 5/20* (2006.01)
(Continued)

(52) U.S. Cl.
CPC ............ *H04N 23/698* (2023.01); *G06T 5/20* (2013.01); *G06T 7/70* (2017.01); *G06T 7/90* (2017.01);
(Continued)

(58) Field of Classification Search
CPC ...... H04N 23/698; H04N 23/69; H04N 23/55; H04N 5/272; G06T 7/90; G06T 7/70; G06T 5/20; G06T 2207/10024; G06V 20/70
See application file for complete search history.

(56) References Cited

U.S. PATENT DOCUMENTS 8,233,075 B2 7/2012 Lavrentiev et al.
8,830,320 B2 9/2014 Swinford
(Continued)

FOREIGN PATENT DOCUMENTS

AU 2012286735 B2 10/2016
CN 113852752 A 12/2021
(Continued)

OTHER PUBLICATIONS

Glo3D.com, Guided Pohotography, Glo3D.com/car-photography-app (website).*
(Continued)

*Primary Examiner* — James T Boylan
(74) *Attorney, Agent, or Firm* — Thompson Patent Law Offices PC

(57) ABSTRACT
Apparatus and associated methods relate to image generation systems. In an illustrative example, an image capturing module (ICM) may be configured to capture a real-time image of a target object (e.g., a car). The ICM, for example, may include a gyro-sensor and a user interface. For example, in a studio mode, the ICM may automatically generate a 360° image of the target object as a function of the gyro-sensor measurement. In a guided capture mode, for example, the ICM may generate guidance indicia at the user interface to assist in capturing components of the target object. In some implementations, the ICM may automatically apply image adjustments based on pixel segmentation and color identification such that the images captured are according to
(Continued)

a predetermined image standard profile. Various embodiments may advantageously automatically be captured and standardized images of a target object based on the real-time image.

20 Claims, 8 Drawing Sheets

(51) Int. Cl.

| | |
|---|---|
| *G06T 7/70* | (2017.01) |
| *G06T 7/90* | (2017.01) |
| *G06V 20/70* | (2022.01) |
| *H04N 5/272* | (2006.01) |
| *H04N 23/55* | (2023.01) |
| *H04N 23/69* | (2023.01) |

(52) U.S. Cl.
CPC ............. *G06V 20/70* (2022.01); *H04N 5/272* (2013.01); *H04N 23/55* (2023.01); *H04N 23/69* (2023.01); *G06T 2207/10024* (2013.01)

(56) References Cited

U.S. PATENT DOCUMENTS

| | | | |
|---|---|---|---|
| 8,830,321 | B2 | 9/2014 | Swinford |
| 8,836,785 | B2 | 9/2014 | Swinford |
| 9,438,864 | B2 | 9/2016 | Swinford |
| 9,600,822 | B2 | 3/2017 | Pyle et al. |
| 10,332,295 | B1 | 6/2019 | Saporta et al. |
| 10,412,300 | B2 * | 9/2019 | Duffy ..................... H04N 23/62 |
| 10,665,024 | B2 | 5/2020 | Holzer et al. |
| 10,726,593 | B2 | 7/2020 | Holzer et al. |
| 10,861,213 | B1 | 12/2020 | Holzer et al. |
| 10,863,210 | B2 | 12/2020 | Holzer et al. |
| 10,949,978 | B2 | 3/2021 | Holzer et al. |
| 10,950,032 | B2 | 3/2021 | Holzer et al. |
| 11,006,095 | B2 | 5/2021 | Holzer et al. |
| 11,290,638 | B1 | 3/2022 | Duffy |
| 11,321,743 | B2 | 5/2022 | Daly et al. |
| 11,435,869 | B2 | 9/2022 | Holzer et al. |
| 11,436,275 | B2 | 9/2022 | Holzer et al. |
| 11,438,565 | B2 | 9/2022 | Trevor et al. |
| 11,475,626 | B2 | 10/2022 | Holzer et al. |
| 11,562,474 | B2 * | 1/2023 | Holzer ................... G06V 20/20 |
| 11,570,369 | B1 | 1/2023 | Swinford |
| 11,632,533 | B2 | 4/2023 | Holzer et al. |
| 11,636,637 | B2 | 4/2023 | Holzer et al. |
| 2018/0160019 | A1 * | 6/2018 | Scheich ................. H04N 23/56 |
| 2019/0208117 | A1 | 7/2019 | Jung et al. |
| 2020/0282811 | A1 | 9/2020 | Winn et al. |
| 2022/0146915 | A1 * | 5/2022 | Scheich .............. G03B 17/561 |
| 2022/0187685 | A1 * | 6/2022 | Scheich ................. H04N 23/66 |
| 2022/0303408 | A1 | 9/2022 | Scheich |

FOREIGN PATENT DOCUMENTS

| | | | |
|---|---|---|---|
| CN | 114449167 | A | 5/2022 |
| CN | 115499581 | A | 12/2022 |
| KR | 20130058150 | A | 6/2013 |
| WO | 2006002796 | A1 | 1/2006 |
| WO | 2021082662 | A1 | 5/2021 |
| WO | 2021195896 | A1 | 10/2021 |
| WO | 2023036199 | A1 | 3/2023 |

OTHER PUBLICATIONS

AVfoundation, Capturing Still and Live Photos, retrieved from the internet Apr. 11, 2022, https://developer.apple.com/documentation/avfoundation/photo_capture/capturing_still_and_live_photos.

Dealer Image Pro, Photo Assistant, Auto Dealer Photography, retrieved from the internet Mar. 16, 2023, https://www.dealerimagepro.com/photo-assistant/.

Mitchell Intl., Guided Photo Capture Web App, UX Research and Design, retrieved from the internet Apr. 11, 2022, https://www.caitlin-cagampan.com/guided-photo-capture.

MotorStreet 360, Car Photo Studio Booths, retrieved from the internet May 2, 2023, https://motorstreet360.com/car-studio-booths.php.

Travelers, How to Use the Travelers Photo Capture for Auto Application, retrieved from the internet Apr. 11, 2022, https://www.travelers.com/claims/guides/auto-photo-capture-application.

* cited by examiner

600

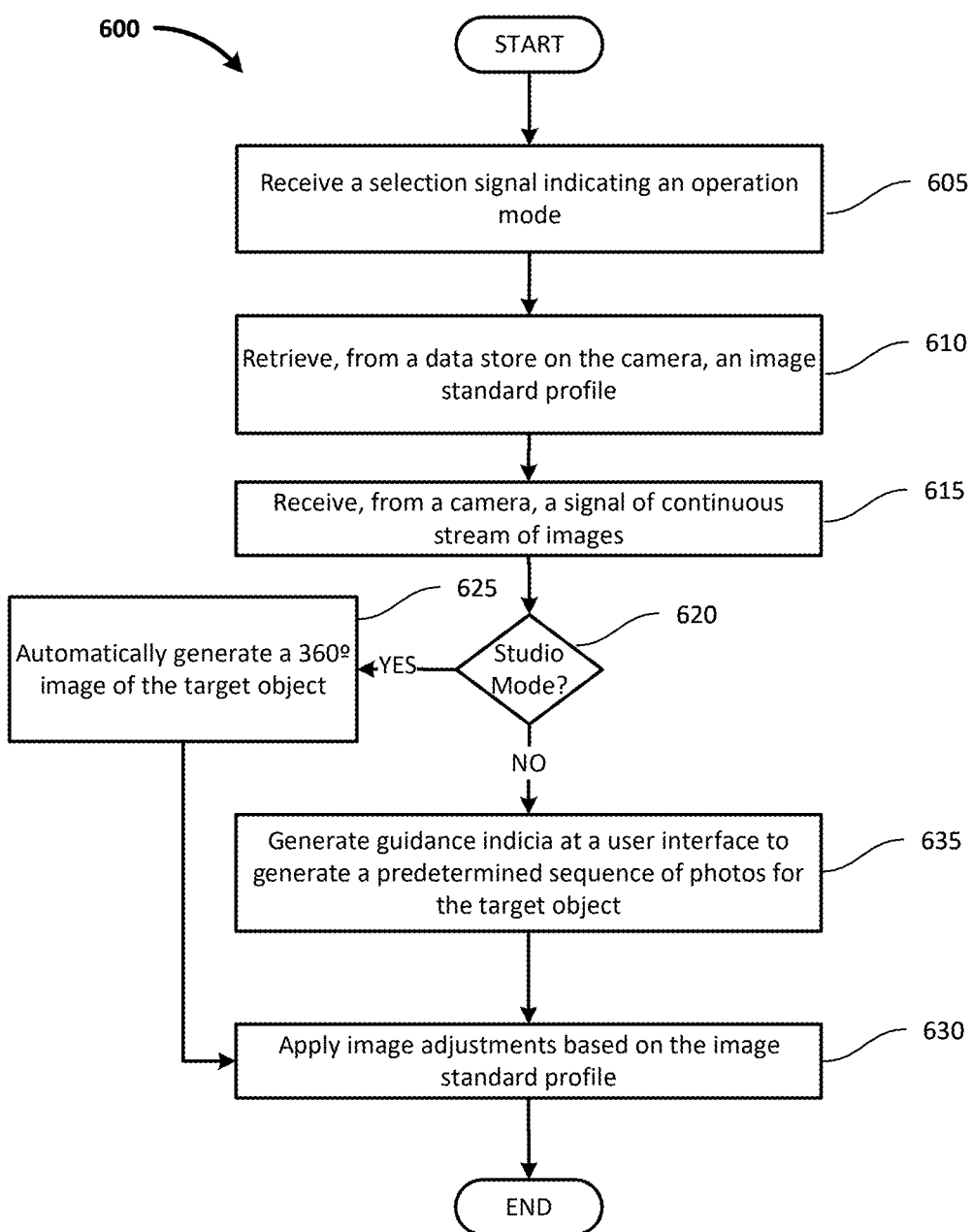

START

Receive a selection signal indicating an operation mode — 605

Retrieve, from a data store on the camera, an image standard profile — 610

Receive, from a camera, a signal of continuous stream of images — 615

625 — Automatically generate a 360º image of the target object

←YES— Studio Mode? — 620

NO

Generate guidance indicia at a user interface to generate a predetermined sequence of photos for the target object — 635

Apply image adjustments based on the image standard profile — 630

END

FIG. 6

GUIDED REAL-TIME VEHICLE IMAGE ANALYZING DIGITAL CAMERA WITH AUTOMATIC PATTERN RECOGNITION AND ENHANCEMENT

CROSS-REFERENCE TO RELATED APPLICATIONS

This application claims the benefit of U.S. Provisional Application Ser. No. 63/364,250, titled "Artificial Intelligence Guided Interactive Vehicle Photograph Guidance and Enhancement on Handheld Device," filed by Jay Smithweck, on May 5, 2022.

This application also claims the benefit of U.S. Provisional Application Ser. No. 63/500,190, titled "Artificial Intelligence Guided Interactive Vehicle Photograph Guidance and Enhancement on Handheld Device," filed by Jay Smithweck, et al., on May 4, 2023.

This application incorporates the entire contents of the foregoing application(s) herein by reference.

TECHNICAL FIELD

Various embodiments relate generally to image capture systems having automatically generated guidance with image analysis applications based on color and object classifications.

BACKGROUND

Commercial photography is widely used in wholesale, retail, and professional services. The commercial photography may include advertising photography for illustrating and selling a service or product, architectural photography, event photography for photographing guests and occurrences at mostly social events, fashion photography, etc. In some examples, a commercial photography may include 360-degree product photography that displays a series of photos to give the impression of a rotating object. In some examples, the 360-degree photo may be popular in ecommerce web sites to visualize various products.

Image analysis is an essential component of commercial photography. In order to capture high-quality images, photographers rely on image analysis techniques to determine the best lighting, composition, and other variables that will make their photographs stand out. Image analysis can be performed using a variety of tools, such as digital cameras, image editing software, and specialized algorithms. By leveraging these tools, commercial photographers can produce stunning images that are well-suited to their clients' needs.

In addition to image analysis, commercial photography often involves a variety of image enhancement and transformation techniques. These techniques can be used to adjust the color balance, contrast, and other properties of an image in order to achieve a desired effect. For example, an architectural photographer may use image enhancement techniques to highlight the texture of a building's facade, while a fashion photographer may use transformation techniques to create unique visual effects that enhance the appearance of a model's clothing or accessories. By applying these techniques, commercial photographers can produce images that are both visually stunning and highly effective at conveying a specific message or aesthetic.

SUMMARY

Apparatus and associated methods relate to image generation systems. In an illustrative example, an image capturing module (ICM) may be configured to capture a real-time image of a target object (e.g., a car). The ICM, for example, may include a gyro-sensor and a user interface. For example, in a studio mode, the ICM may automatically generate a 360° image of the target object as a function of the gyro-sensor measurement. In a guided capture mode, for example, the ICM may generate guidance indicia at the user interface to assist in capturing components of the target object. In some implementations, the ICM may automatically apply image adjustments based on pixel segmentation and color identification such that the images captured are according to a predetermined image standard profile. Various embodiments may advantageously automatically be captured and standardized images of a target object based on the real-time image.

Various embodiments may achieve one or more advantages. For example, some embodiments may advantageously identify a vehicle identification number automatically from an image captured by the image capturing device. Some embodiments, for example, may automatically detect a position of the target object from a captured image and advantageously generate guidance at the user interface to automatically guide an adjustment of the position. For example, some embodiments may advantageously stop recording in the studio mode automatically when a full circle is completed. Some embodiments, for example, may advantageously generate a warning in the studio mode once an external disturbance is above a threshold. For example, some embodiments may advantageously detect a position of the target object and automatically adjust a zoom level at the target object based on the position. Some embodiments, for example, may advantageously verify whether a user has captured a required image. For example, some embodiments may automatically apply a color balance filter for an interior image of the target object. Some embodiments, for example, may advantageously remove and replace a background of an image automatically. For example, some embodiment may advantageously remove glare and reflection from a captured image.

The details of various embodiments are set forth in the accompanying drawings and the description below. Other features and advantages will be apparent from the description and drawings, and from the claims.

BRIEF DESCRIPTION OF THE DRAWINGS

FIG. 6 depicts an exemplary runtime method of an exemplary AGICE.

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an automatic guidance and image capturing engine (AGICE) is introduced with reference to FIGS. 1-2. Second, that introduction leads to a description with reference to FIGS. 3A-4B of some exemplary embodiments of operation modes for the AGICE. Third, with reference to FIGS. 5A-C, an exemplary external control device is described in application to exemplary AGICE. Fourth, with reference to FIGS. 6-8, this document describes exemplary apparatus and methods useful for using the AGICE. Finally, the document discusses further embodiments, exemplary applications and aspects relating to automatically capturing and standardizing images of a target object.

Figure 1:
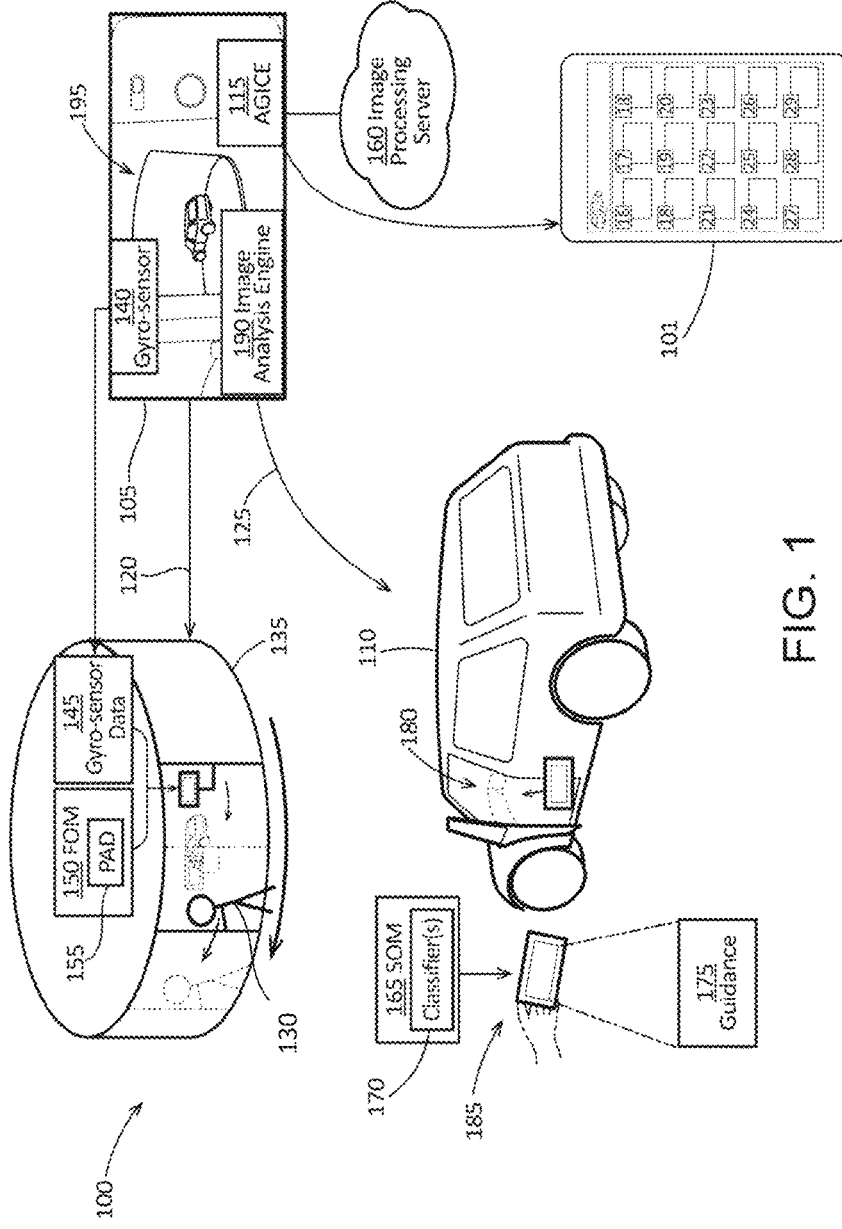
FIG. 1 depicts an exemplary automatic guidance and image capturing engine (AGICE) employed in an illustrative use-case scenario.

FIG. 1 depicts an exemplary automatic guidance and image capturing engine (AGICE) employed in an illustrative use-case scenario. In a vehicle photo-shooting session 100, an image capturing device 105 may be used to capture multiple pictures 101 of a vehicle 110. For example, the image capturing device 105 may be a mobile device. For example, the image capturing device 105 may be a digital camera. For example, the multiple pictures 101 may be used for marketing the vehicle 110 (e.g., for posting on a seller website, a magazine, a blog).

As shown, the image capturing device 105 includes an automatic guidance and image capturing engine (AGICE 115). In some implementations, the AGICE 115 may automatically detect an operating mode of the Image capturing device 105. In this example, the operating mode includes a studio mode 120 and a guided capture mode 125. For example, the Image capturing device 105 may selectively operate in the studio mode 120 or the guided capture mode 125 by a user 130 using a user interface of the AGICE 115.

As shown, the user 130 uses the image capturing device 105 in the studio mode 120 in a rotating photo-booth 135. In some implementations, the rotating photo-booth 135 may include a rotating wall structure. For example, the rotating wall may spin 360° around an object within the rotating photo-booth 135.

In this example, the image capturing device 105 includes a gyro-sensor 140. For example, the gyro-sensor 140 may generate a gyro-sensor 145 as a function of a detected angular displacement of the image capturing device 105. In the studio mode 120, the AGICE 115, for example, may receive the gyro-sensor 145. As an illustrative example shown in FIG. 1 without limitation, after turning on the studio mode 120, the user 130 may mount the image capturing device 105 onto an edge of the wall of the rotating photo-booth 135. Then, for example, the user 130 may push the wall around in a full circle. For example, the AGICE 115 may generate an angular displacement of image capturing device 105 based on the measured angular information by the gyro-sensor 140. For example, the plurality of images are captured based on an angular displacement between a previously captured image and a current image.

The AGICE 115, in some implementations, may include a 360° automotive spin video capture function. In the studio mode 120, the AGICE 115 may load a first objective model 150. The first objective model 150 includes a predetermined angular displacement 155. Based on the predetermined angular displacement 155, the AGICE 115 may capture images of the vehicle 110 periodically. For example, the gyro-sensor 140 may generate an angular displacement of the image capturing device 105. For example, the predetermined angular displacement 155 may be 3°. For example, the predetermined angular displacement 155 may be 5°. For example, the predetermined angular displacement 155 may be 10°. In some implementations, for example, the predetermined angular displacement 155 may be 15°.

In some implementations, by way of example and not limitation, the predetermined angular displacement 155 may be 20° or greater. In some implementations, the predetermined angular displacement 155 may be variable (e.g., depending on location around the circle, depending on the vehicle). The variable predetermined angular displacement may, for example, be linear. In some implementations, the variable predetermined angular displacement may, for example, be non-linear (e.g., depending on color, depending on field of view overlap). For example, in some implementations, the variable angular displacement may be dynamically determined based on predetermined parameters.

Some implementations of the exterior studio mode may, for example, be implemented such as disclosed at least with reference to FIGS. 1-2, 4A, and 5-7, and pages 6-19 of Appendix A, of U.S. Provisional Application Ser. No. 63/364,250, titled "Artificial Intelligence Guided Interactive Vehicle Photograph Guidance and Enhancement on Handheld Device," filed by Jay Smithweck, on May 5, 2022, the entire contents of which are incorporated herein by reference.

Some implementations of the exterior studio mode may, for example, be implemented such as disclosed at least with reference to FIGS. 1 and 3-4 of U.S. Provisional Application Ser. No. 63/500,190 titled "Artificial Intelligence Guided Interactive Vehicle Photograph Guidance and Enhancement on Handheld Device, filed by Jay Smithweck, et al., on May 4, 2023, the entire contents of which are incorporated herein by reference.

In some implementations, the first objective model 150 may also include a stabilizing model. Using the gyro-sensor 145, the AGICE 115 may apply the stabilizing model to a capture stream of images by the image capturing device 105 as a function of the data received from the gyro-sensor 140. In some implementations, the AGICE 115 may automatically stop recording when a full circle is completed. For example, if the predetermined angular displacement 155 is 5°. The AGICE 115 may, for example, transmit a stop recording signal to an image capturing module after 72 images are captured.

In some implementations, the stabilizing model may monitor a stream of images captured by the image capturing device 105 in real-time. For example, the AGICE 115 may continuously evaluate a recording process in the studio mode 120. For example, the AGICE 115 may be configured to use the first objective model 150 to ensure that the vehicle 110 is within view. For example, the AGICE 115 may use the gyro-sensor 145 to determine whether the image capturing device 105 is steady. In some implementations, when excessive vertical movement is detected (e.g., based on the gyro-sensor 145) or the vehicle 110 is captured outside of a predetermined frame (e.g., based on a definition in the first objective model 150), the AGICE 115 may generate an alert to the user. In some examples, the AGICE 115 may abort the recording to advantageously prevent capturing unusable footage.

In this example, the AGICE 115 is operably coupled to an image processing server 160. For example, the AGICE 115 may be connected to the image processing server 160 via a communication network. For example, the AGICE 115 may be connected to the image processing server 160 via the Internet. For example, the AGICE 115 may be connected to the image processing server 160 via a local area network (LAN). For example, the image processing server 160 may provide advanced and computationally extensive image processing power to the AGICE 115. In some implementations, the AGICE 115 may use the image processing server 160 to replace a background of one or more captured images (e.g., the captured video frames in the studio mode 120). After the image processing server 160 processed the captured image, the AGICE 115 may generate and store the multiple pictures 101 in a standardized quality.

In some implementations, the image processing server 160 may include (generative) artificial Intelligence (AI) technology. For example, the AGICE 115 may use the image processing server 160 to perform a comprehensive analysis of the captured video frames. For example, the AI technology may isolate the vehicle 110 from a background wall (e.g., the wall of the rotating photo-booth 135) and replace it with a clean, unobtrusive backdrop. In some examples, the AI technology may detect and remove glares of, for example, booth lamps from a vehicle body and windows from the vehicle 110. Accordingly, the AGICE 115 may advantageously provide captured images with standardized visual appearance and professional image.

In the guided capture mode 125, the AGICE 115 may retrieve a second objective model 165. For example, the second objective model 165 may include a predetermined set of photos for capturing an image of the vehicle 110. For example, the predetermined set of photos may include various components of the vehicle 110 (e.g., a front wheel, an engine, a dashboard, a steering wheel). In this example, the second objective model 165 may include classifier(s) 170 to identify real-time image parameters from a captured image.

For example, the classifier(s) 170 may include a segmentation classifier configured to classify an object of the vehicle 110 (e.g., dashboard) from an image. In some examples, the classifier(s) 170 may include an object detector configured to generate an output array of bounding boxes. For example, the object detector may generate an output class label for each bounding box. For example, the classifier(s) 170 may include a pixel segmentation classifier configured to identify pixels in an image that belongs to each of the detected objects (e.g., the dashboard, the back seat, the steering wheel of the vehicle 110). In various implementations, some or all of the classifier(s) 170 may be generated based on trained neural networks. In some implementations, some or all of the classifier(s) 170 may be generated based on trained decision trees. In some implementations, some or all of the classifier(s) 170 may be generated based on trained support vector machines In some implementations, the classifier(s) 170 may be generated based on a combination of artificial classifiers.

In this example, the AGICE 115 may generate a guidance 175 during the studio mode 120. For example, the guidance 175 may include messages and/or images of warning, information, and/or alerts. In some implementations, the classifier(s) 170 may be used to determine which part of the car has been photographed in the guided capture mode 125. As an illustrative example without limitation, after an image is captured, the AGICE 115 may use the classifier(s) 170 to check whether a required component is captured. For example, at a step, the user 130 may be required to take a photo of the steering wheel. However, the user 130 captured an image of the dashboard. For example, the AGICE 115 may generate a guidance "are you sure this is of the right image?"

In this example, the image capturing device 105 further includes an image processing engine (IPE 190). For example, the IPE 190 may generate real-time image data based on a preview image 195 captured by the image capturing device 105. For example, the real-time image data may include real-time image settings (e.g., white balance, zoom, color saturation parameters, contrast). In some implementations, as a function of the real-time image data, the AGICE 115 may be configured to automatically zoom into a required component at the step. For example, when the current step is to take a photo of the wheel and the wheel is no in a desired frame (e.g., too small, not in center), the AGICE 115 may use the object detector to detect a location of the wheel in the frame (e.g., around a bounding box), and transmit a signal to the image capturing device to zoom (e.g., focus) into the wheel.

In some implementations, the AGICE 115 may use the second objective model 165 to classify and enhance photos based on a current environment and shot type. In some implementations, the classifier(s) 170 may include a setting classifier to detect whether a photo is taken inside or outside of the rotating photo-booth 135 and/or at an interior session 180 or an exterior session 185 of a photo-shooting session. For example, the AGICE 115 may detect the interior session 180 when the user 130 is taking a photo within the vehicle 110 (e.g., for the dashboard, the steering wheel). For example, the AGICE 115 may detect the exterior session 185 when the user 130 is taking a photo outside or partially outside of the vehicle 110 (e.g., for the driver side window control, the engine, the boot).

Based on the detected environment and shot type, the AGICE 115 may generate corresponding enhanced visual and lighting adjustments for each image. For example, the AGICE 115 may, in the interior session 180, retrieve a color detection model from the second objective model 165 to inter an interior color of the vehicle 110. For example, after a photo is taken, the AGICE 115 may use the image processing server 160 to apply predetermined filter(s) based on the inferred interior color.

In the interior session 180, for example, the AGICE 115 may counteract yellowness caused by auto white balance of the image capturing device 105. For example, the AGICE 115 may generate clearer and more vibrant window displays. In some implementations, the AGICE 115 may also detect a color of the interior seats. Based on the color, the AGICE 115 may automatically apply an image filter to advantageously complement and accentuate interior aesthetics of the vehicle 110.

In some implementations, the AGICE 115 may automatically apply appropriate lighting filters based on whether the photo shooting session is in the interior session 180 or the exterior session 185. For example, when a photo-session is the exterior session 185, the AGICE 115 may identify a color of the vehicle 110 and apply color filters (e.g., white balancing filter) as a function of the second objective model 165. In some implementations, the AGICE 115 may perform background replacement, glare removal, floor alteration. For example, the AGICE 115 may generate shadows and reflections to enhance the overall image quality.

In various implementations, a mobile device (e.g., the image capturing device 105) may include an image generation system (e.g., the AGICE 115). For example, based on a preview image captured by the mobile device, the image generation system may identify a studio mode and a guided capture mode of a photo-shooting session. For example, in the studio mode, the image generation system may perform studio operations to automatically generate a 360° image of an object (e.g., the vehicle 110) based on multiple captured images (e.g., the video recorded while the user 130 spins the wall of the rotating photo-booth 135).

For example, in the guided capture mode, the image generation system may perform classification to identify the object in the preview image. For example, the image generation system may identify an environment of the photo-shooting session (e.g., the exterior session 185 or the interior session 180). For example, the image generation system may identify the object within an object profile (e.g., using the classifier(s) 170). For example, the image generation system may generate a guidance output (e.g., the guidance 175) at the mobile device.

In some implementations, the image generation system may include a gyroscope (e.g., the gyro-sensor 140) configured to detect, in the studio mode, a selected angle of movement of the object (e.g., based on referenced angular movement of the image capturing device 105). For example, the mobile device may capture an image of the object based on an angular displacement of the object since the previous image was taken.

In some implementations, the image processing engine may be configured to automatically apply filters to a preview image based on the identified environment to generate a finished image. For example, in the interior session, the image processing engine may infer an interior color of the object, and apply predetermined filter(s) based on the color analysis. In the exterior session, for example, the image processing engine applies a color filter based on the environment.

Some implementations of the guided capture mode may, for example, be implemented such as disclosed at least with reference to FIGS. 1-5 and 8-9, and pages 17-51 of Appendix A, of U.S. Provisional Application Ser. No. 63/364,250, titled "Artificial Intelligence Guided Interactive Vehicle Photograph Guidance and Enhancement on Handheld Device," filed by Jay Smithweck, on May 5, 2022, the entire contents of which are incorporated herein by reference.

Some implementations of the exterior studio mode may, for example, be implemented such as disclosed at least with reference to FIGS. 1-4, and pages 1-113 of Appendix A, of U.S. Provisional Application Ser. No. 63/500,190, titled "Artificial Intelligence Guided Interactive Vehicle Photograph Guidance and Enhancement on Handheld Device, filed by Jay Smithweck, et al., on May 4, 2023, the entire contents of which are incorporated herein by reference.

In an illustrative example without limitation, the AGICE 115 may provide additional capabilities in generating marketing pictures for the vehicle 110. In an illustrative example, the multiple pictures 101 are to be generated using a mobile device without the AGICE 115, the user 130 may be required to, first, be trained to memorize all required components for generating the multiple pictures 101. Second, the user 130 may have to manually capture enough images to generate the 360° picture of the vehicle 110. Third, the user 130 may be required to be trained to use photo editing software to process the captured images for background removal/replacement, glare removal, color adjustments, white balance adjustments, or a combination thereof.

Using the AGICE 115, for example, the user 130 may be automatically guided, during the exterior session 185, to capture a vehicle identification number picture. For example, the VIN picture may be automatically and be optical-character-recognized (OCRed) into the VIN number.

For example, the image capturing device 105 may then automatically retrieve information about the vehicle 110 based on the VIN number. Thus, the user 130 may not be required to manually input information to a marketing system.

For example, when the user 130 starts shooting in the guided capture mode 125, the AGICE 115 may automatically detect a position of a required component of the vehicle 110 and auto-zoom into the component. For example, the second objective model 165 may include predetermined picture standards that auto select & apply image filters to make a captured image of the vehicle 110 attractive to buyers. The second objective model 165 may also include a predetermined sequence of images to be taken so that the user 130 may not be required to memorize the sequence. Additionally, the guidance 175 may be generated to remind the user 130 to take each of the shots in the sequence.

When the user 130 is shooting in the interior session 180, the AGICE 115 may determine what kind of colors are inside the vehicle 110 and apply color filters based on interior (e.g., beige vs gray interior). For example, the applied color filters may override an auto-balance of the image capturing module of the image capturing device 105. For example, accordingly, the AGICE 115 may remove additional work on the photo editing machine for the user 130.

For example, when the user 130 is shooting in the exterior session 185, the AGICE 115 may use the second objective model 165 and/or the image processing server 160 to extract the vehicle 110 from a background (e.g., inside and outside of the rotating photo-booth 135). For example, the AGICE 115 may generate appropriate shallow and light upon replacement of the background. For example, the user 130 may select from predetermined floors/backgrounds (e.g., white epoxy floor with reflections, gray floor, other colored floors). These operations, if performed manually, may take tens of hours. Additionally, quality of the generated images may be difficult to maintain as uniformly standardized due to human errors.

In some implementations, the AGICE 115 may include automatic centering and zoom level adjustment. For example, the AGICE 115 may analyze video frames from the to ensure the car remains centered throughout the spin, automatically adjusting the zoom level for optimal visual representation. Accordingly, the AGICE 115 may advantageously deliver a consistently high-quality output, irrespective of the user's recording proficiency.

Figure 2:
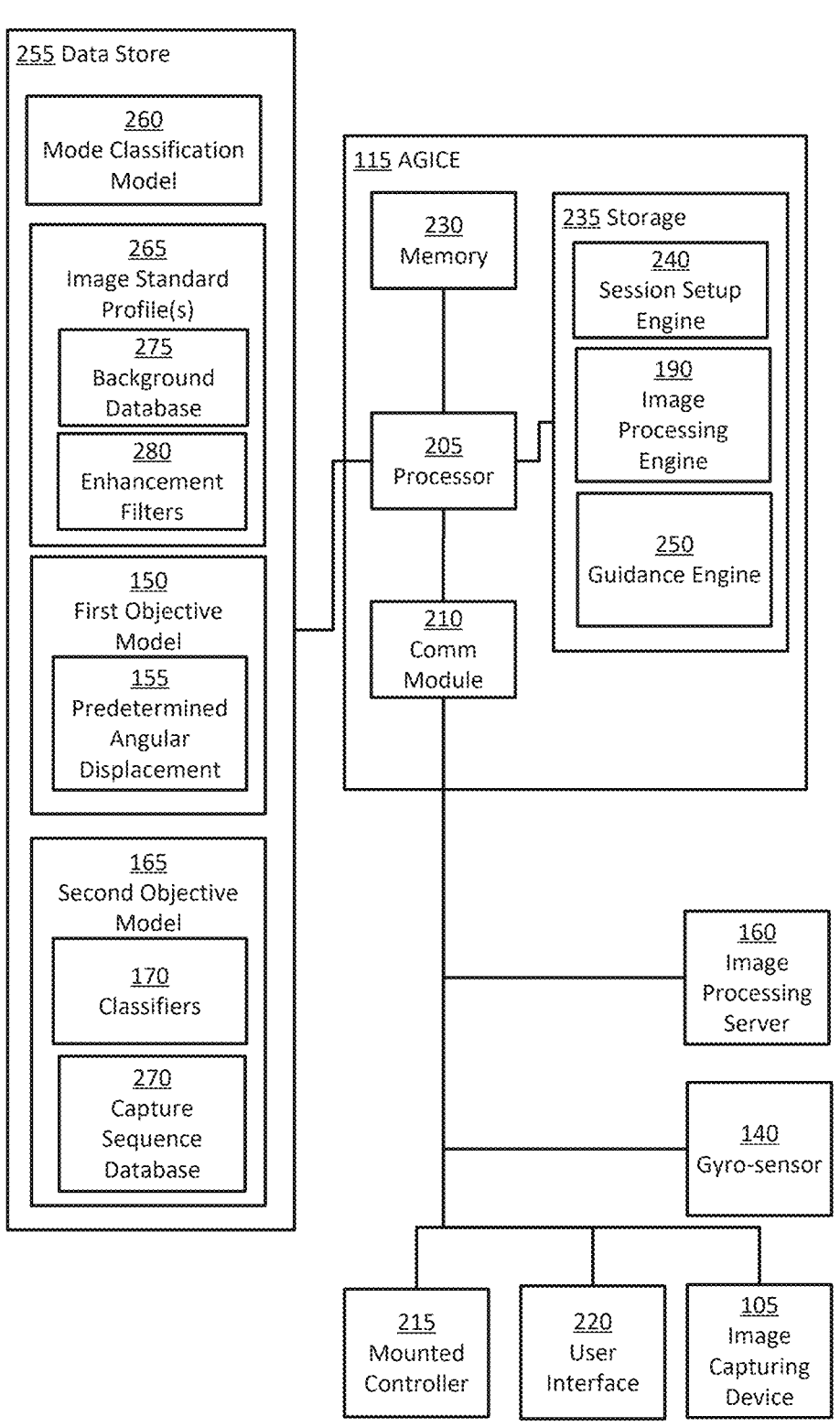
FIG. 2 is a block diagram depicting an exemplary automatic guidance and image capturing engine (AGICE).

FIG. 2 is a block diagram depicting an exemplary automatic guidance and image capturing engine (AGICE). FIG. 2 is a block diagram depicting an exemplary AGICE 115. The AGICE 115 includes a processor 205. The processor 205 may, for example, include one or more processors. The processor 205 is operably coupled to a communication module 210. The communication module 210 may, for example, include wired communication. The communication module 210 may, for example, include wireless communication.

In the depicted example, the communication module 210 is operably coupled to a mounted controller 215, a user interface 220, and an image capturing device 105. For example, the mounted controller 215 may be releasably coupled to the image capturing device 105 and configured to transmit image capture signal to the image capturing device 105. The image capturing device 105, for example, may continuously capture a stream of preview images during operation. For example, upon receiving the image capture signal, the image capturing device 105 may save a current preview images in a storage device.

The user interface 220 may, for example, display the stream of preview images from the image capturing device 105. For example, the user interface 220 may display the guidance 175. In some examples, the user interface 220 may also include user control. For example, the user control may include control for the user 130 to select the operation mode (e.g., the studio mode 120, the guided capture mode 125) of the AGICE 115.

The communication module 210 is operably coupled to the gyro-sensor 140 and the image processing server 160. For example, the AGICE 115 may receive the gyro-sensor 145 from the gyro-sensor 140.

For example, the AGICE 115 may transmit a captured image to the image processing server 160 to be processed (e.g., for background replacement). For example, the AGICE 115 may receive the processed image from the image processing server 160 for storage.

The processor 205 is operably coupled to a memory module 230. The memory module 230 may, for example, include one or more memory modules (e.g., random-access memory (RAM)). The processor 205 is operably coupled to a storage module 235. The storage module 235 may, for example, include one or more storage modules (e.g., non-volatile memory).

In the depicted example, the storage module 235 includes a Session Setup Engine (SSE 240). The SSE 240 may, for example, perform set up operations for a user photo session. In some implementations, the SSE 240 may identify a target car. For example, the SSE 240 may identify the interior session 180 and the exterior session 185. In some implementations, the SSE 240 may identify, based on an image received, detailed information (e.g., a color and make) of the target car. In some implementations, the SSE 240 may prompt a user input (e.g., an input string) to identify the detailed information of the target car.

The storage module 235 also includes the IPE 190 and a guidance engine 250. For example, the IPE 190 may generate real-time image data based on a preview image 195 captured by the image capturing device 105. In some implementations, the IPE 190 may operate based on a detected session from the SSE 240. For example, the IPE 190 may be operated in the studio mode to automatically capture a 360° photo of the target car based on the predetermined angular displacement 155. For example, the IPE 190 may select and apply different sets of filters based on whether the current photo-session is the interior session 180 or the exterior session 185.

The guidance engine 250, for example, may be generated based on user input and a current preview image from the image capturing device 105. For example, based on a current step, the guidance engine 250 may generate an image and a text to remind the user 130 of which component of the target car is to be taken. Some embodiments of the guidance generated by the guidance engine 250 are discussed with reference to FIGS. 4A-B.

In some implementations, the guidance engine 250 may generate alerts or warnings to the user based on input from the gyro-sensor 140. For example, if a movement of the image capturing device 105 is above a threshold, the guidance engine 250 may generate a message to the user that captured images are not usable.

The processor 205 is operably coupled to a data store 255. The data store 255 includes a mode classification model 260 and an image standard profile(s) (ISPs 265). In various implementations, the AGICE 115 may retrieve different ISPs 265 based on an identified model/make of an object. For example, the SSE 240 may use the mode classification model 260 to identify an operating mode (e.g., studio mode and guided capture mode, and interior session and exterior session).

The ISPs 265 includes a capture sequence database 270 and a background database 275. In each operating mode, for example, the AGICE 115 may retrieve the ISPs 265 to generate guidance and image filters. For example, based on a current session, the guidance engine 250 may generate the guidance 175 to guide the user 130 for a required component. For example, the IPE 190 may identify the required component based on the mode classification model 260 and auto-zoom based on the classifier(s) 170 of the second objective model 165.

The IPE 190 may include image generative adversarial networks (GANs). For example, using the GANs, the IPE 190 may generate new images by removing a background of a captured image and replacing it with an image in the background database 275.

The data store 255 also includes the first objective model 150 and the second objective model 165. For example, in the studio mode, the IPE 190 may retrieve the first objective model 150 to apply image filters (e.g., white balance filter based on lighting in the rotating photo-booth 135) and use the predetermined angular displacement 155 to automatically capture a full circle image of the target car. In the guided capture mode, the IPE 190 may use the classifier(s) 170 to identify components (e.g., Steering wheel, Dashboard, Driver Seat, Rear seats) of the target car.

The ISPs 265 also includes enhancement filters 280. For example, the IPE 190 may use the enhancement filters 280 to process a captured image based on a predetermined image standard. In some implementations, the enhancement filters 280 may also include segmentation models to segment car, wall, floor and window regions. For example, based on the identified segment, the IPE 190 may apply filters to, for example, remove glare at the windows and add contrast to sharpen a color of the exterior of the car. In some implementations, the IPE 190 may automatically remove floor, wall, and other unwanted objects (e.g., person, carton boxes) from a captured image.

In various implementations, image processing operations (e.g., application of filters, image setting adjustments) may be performed offline without invoking the image processing server 160.

Figure 3A:
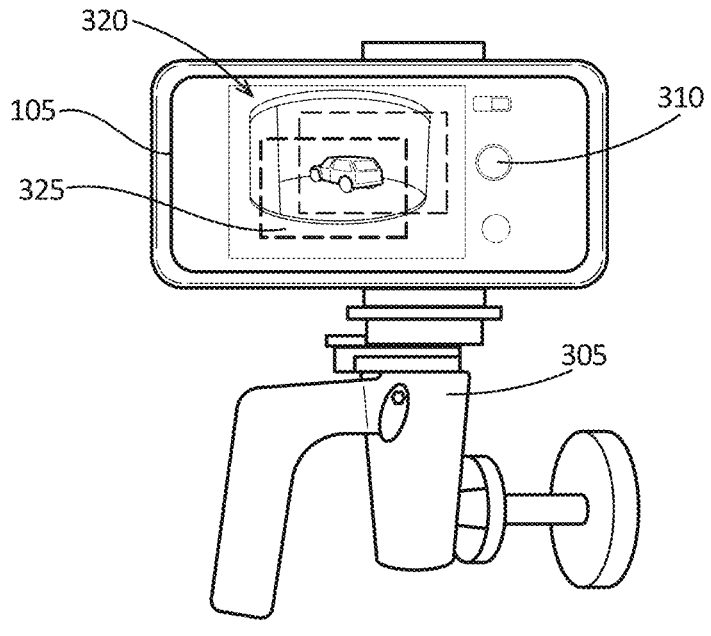
FIG. 3A and FIG. 3B depict an exemplary AGICE operating in a studio mode.
Figure 3B:
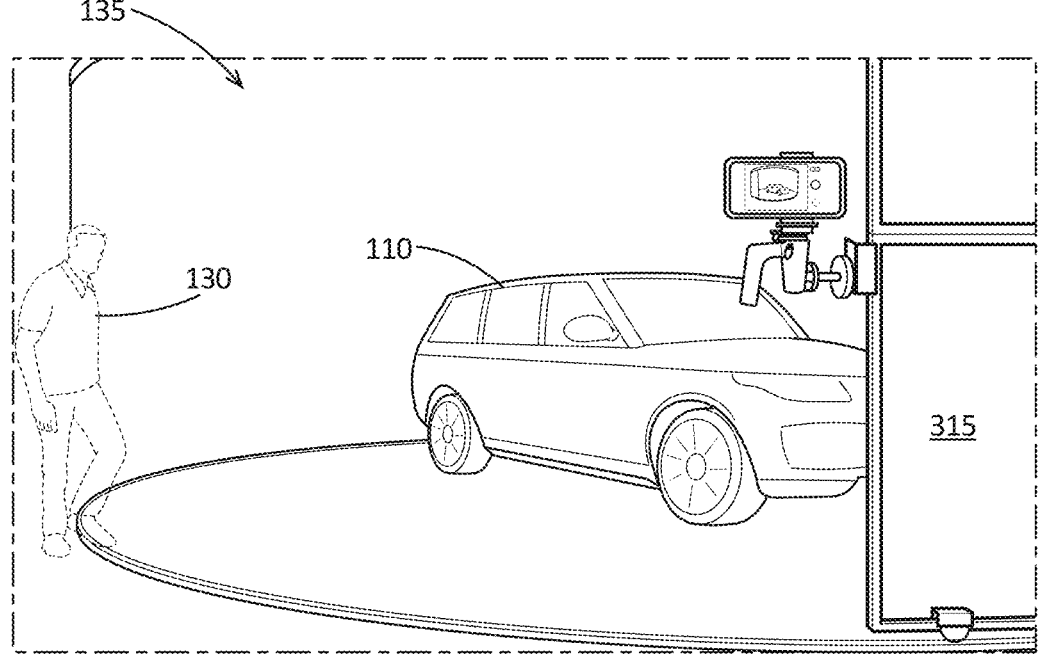

FIG. 3A and FIG. 3B depict an exemplary AGICE operating in a studio mode. As shown in FIG. 3A, the image capturing device 105 may be attached to a mounted controller 305 (e.g., the mounted controller 215 as described in FIG. 2). In the studio mode 120, the image capturing device 105 may be releasably attached to an edge of a wall of the rotating photo-booth 135 using the mounted controller 305. Various embodiments of the mounted controller 305 are further described with reference to FIGS. 5A-C.

As an illustrative example without limitation, the user 130 may select a start capture button 310. As shown in FIG. 3B, the user 130 may push a wall 315 after selecting the start capture button 310. For example, the AGICE 115 may automatically record a full circle of the vehicle 110. For example, the AGICE 115 may stop recording when a full circle of the vehicle 110 is recorded. For example, mounting the image capturing device 105 on a stable structure (e.g., the wall 315) may reduce external disturbance in image capturing during the studio mode.

In some implementations, the AGICE 115 may also generate guidance in the studio mode. For example, the AGICE 115 may use a classifier (e.g., the classifier(s) 170 as described in FIG. 1) to detect the vehicle 110 in a preview image 320.

As an illustrative example shown in FIG. 3A without limitation, based on a position of the vehicle 110 in the preview image 320, the guidance engine 250 may generate bounding boxes 325 to guide a user to place the vehicle 110 in an optimal position for recording.

In some implementations, when an external disturbance (e.g., when the image capturing device 105 is knocked off by the user, or the user touched the image capturing device 105 by mistake) is detected during recording in the studio mode, the guidance engine 250 may generate a warning. In some examples, such warning may be disabled in the guided capture mode because movement is expected.

In some implementations, the first objective model 150 may include a scene recognition system. In some implementations, the AGICE 115 may use the SRS to identify front, rear, and side shots of the vehicle 110. For example, the AGICE 115 may use the SRS to automatically record a video sequence. For example, based on the identification, a user may customize the starting position (e.g., start from front of the vehicle 110) of a spin video to generate a tailored viewing experience.

Figure 4A:
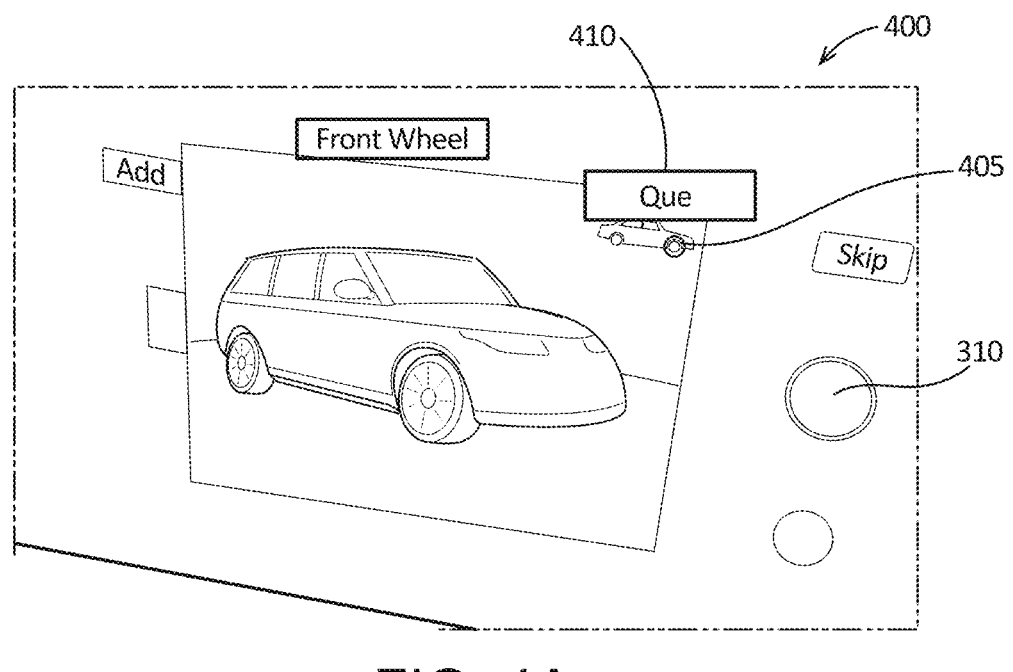
FIG. 4A and FIG. 4B depict an exemplary AGICE operating in a guided capture mode.
Figure 4B:
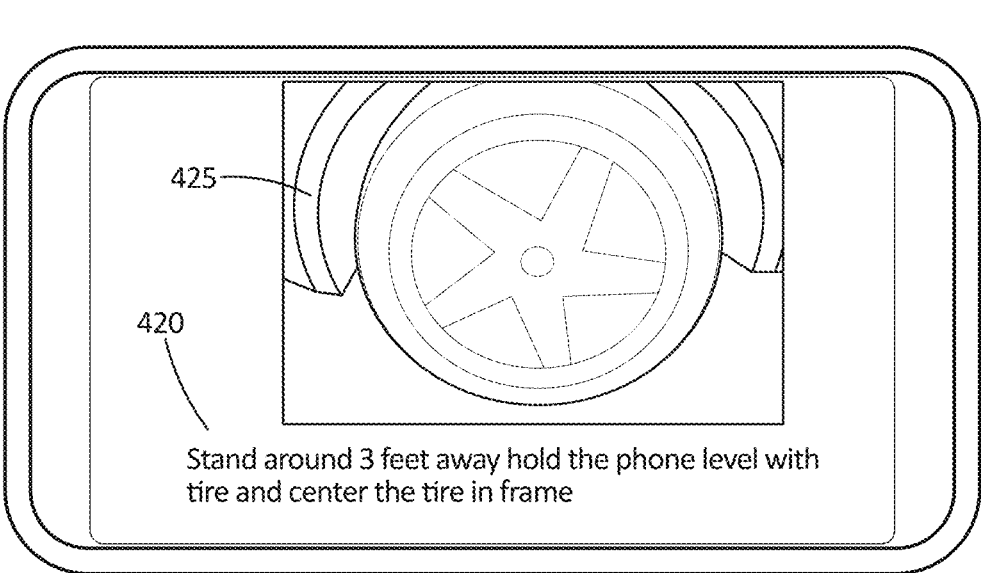

FIG. 4A and FIG. 4B depict an exemplary AGICE operating in a guided capture mode. As shown in FIG. 4A, a user interface 400 includes the preview image 195 and the start capture button 310. The user interface 400 also includes a visual indicia 405 of a required component of a current shot. In this example, the current shot is $10^{th}$ of 36 shots, and a required component is a front wheel.

The user interface 400 also includes a question button 410 (e.g., a "Cue"). For example, the user 130 may select the question button 410 to generate and/or display further guidance from the AGICE 115. As shown in FIG. 4B, a guidance interface 415 may be generated when the question button 410 is selected. As shown, a text guidance 420 and a guidance image 425 may be generated based on the current shot of the capture sequence database 270. In some implementations, by way of example and not limitation, the question button 410 may be displayed as a "What's the Focus" button. The "What's the Focus" button may, for example, provide a user a cue on what the intended subject matter and/or composition of the present image should be focused on (e.g., by the user, automatically).

Figures 5A, 5B, 5C:
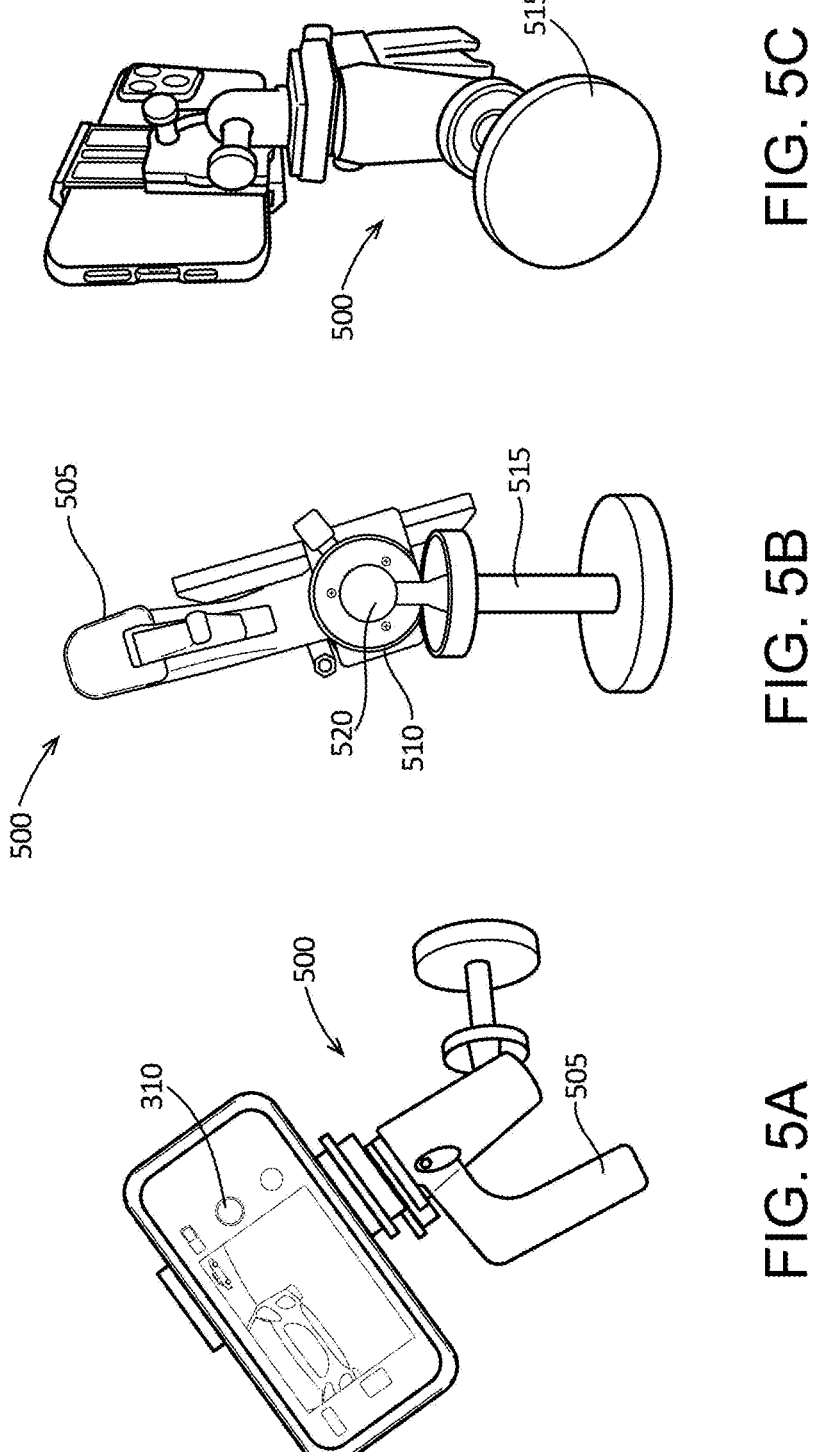
FIG. 5A, FIG. 5B, and FIG. 5C depict an exemplary mounted controller 500 releasably coupled to an image capturing device having an AGICE.

FIG. 5A, FIG. 5B, and FIG. 5C depict an exemplary mounted controller 500 releasably coupled to an image capturing device having an AGICE. As shown in FIG. 5A, an exemplary mounted controller 500 includes a trigger 505. In some implementations, the exemplary mounted controller 500 may be operably coupled wirelessly (e.g., via a Bluetooth network, a near field contact network, a wireless fidelity network) to the image capturing device 105. In some implementations, the exemplary mounted controller 500 may be operably coupled to the image capturing device 105 via a wired network (e.g., via a universal serial bus network). For example, when the trigger 505 is compressed, the exemplary mounted controller 500 may transmit a signal to the image capturing device 105 to capture a photo. In some examples, the trigger 505 may advantageously promote a more stable image compared to selecting the start capture button 310.

In this example, the exemplary mounted controller 500 may be physically adjustable in 360°. As shown in FIGS. 5B-C, a body 510 of the exemplary mounted controller 500 may be coupled to a coupling element 515 via a ball joint 520. In some implementations, the coupling element 515 may be configured to be magnetically coupled to the wall 315. In some implementations, the coupling element 515 may be configured to be adhesively coupled to the wall 315.

FIG. 6 depicts an exemplary runtime method 600 of an exemplary AGICE. For example, the method may be performed by the AGICE 115. In this example, the method 600 begins when a selection signal indicating an operation mode is received in step 605. For example, the user 130 may select an operating mode using the user interface 220. In step 610, from a data store on the camera, an image standard profile is retrieved. For example, the AGICE 115 may retrieve the ISPs 265. For example, the ISPs 265 may include the capture sequence database 270 and the enhancement filters 280.

Next, a signal of continuous stream of images is received from a camera in step 615. For example, the image capturing device 105 may continuously update a preview image to the AGICE 115. In a decision point 620, it is determined whether a studio mode is selected. For example, the user selection in step 605 indicated that it is a studio mode. In some examples, the AGICE 115 may use the SSE 240 and the mode classification model 260 to determine whether it is a studio mode.

If it is in the studio mode, in step 625, a 360° image of the target object is automatically generated. For example, the IPE 190 may generate the 360° image using images recorded by the image capturing device 105. Various methods used in the studio mode are described with reference to FIG. 7. Next, an image adjustment based on the image standard profile is applied in step 630, and the method 600 ends. For example, the AGICE 115 may use the enhancement filters 280 to the captured image(s) based on a current mode and real-time image analysis parameters (e.g., from the real-time images captured by the image capturing device 105).

If, in the decision point 620, it is not in the studio mode (e.g., in the guided capture mode), in step 635, guidance indicia at a user interface is generated to generate a predetermined sequence of photos for the target object. For example, the AGICE 115 may use the capture sequence database 270 to generate the guidance indicia, and the step 630 is repeated. Various methods used in the guided capture mode are described with reference to FIG. 8.

Figure 7:
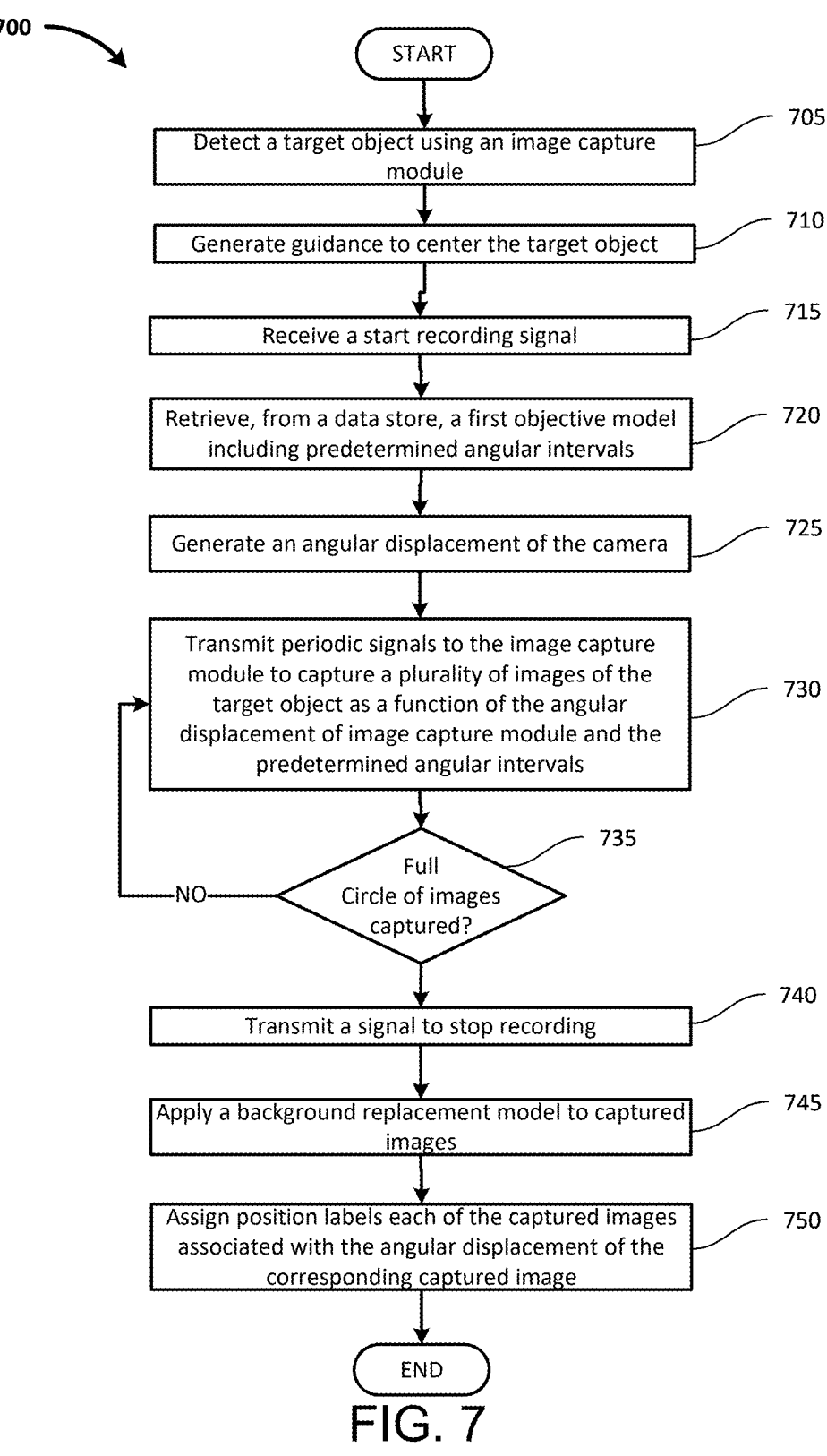
FIG. 7 depicts an exemplary studio mode image capturing method.

FIG. 7 depicts an exemplary studio mode image capturing method 700. For example, the AGICE 115 may perform the studio mode image capturing method 700. In some implementations, the AGICE 115 may perform the studio mode image capturing method 700 in the step 625. The method 700 begins in step 705 when a target object is detected using an image capturing module. For example, the image capturing device 105 may be mounted on the wall 315 facing the vehicle 110. For example, the AGICE 115 may identify the vehicle 110 using the classifier(s) 170 from a preview image. In step 710, a guidance is generated to center the target object. For example, the guidance engine 250 may generate a bounding box to center the vehicle 110 in the preview image.

In step 715, a start recording signal is received. For example, the user 130 may select the start capture button 310 to generate the start recording signal to the AGICE 115. Next, a first objective model including predetermined angular intervals may be retrieved from a data store in step 720. For example, the first objective model 150 including the predetermined angular displacement 155 is retrieved from the data store 255.

In step 725, an angular displacement of the image capture module is generated. For example, the AGICE 115 may receive the angular displacement of the camera from the gyro-sensor 140. For example, the AGICE 115 may determine the angular displacement of the image capture module using the received images from the image capturing device 105.

Next, periodic signals are transmitted to the image capture module to capture a plurality of images of the target object as a function of the angular displacement of the image capture module and the predetermined angular intervals in step 730.

In decision point 735, it is determined whether a full circle of images are captured. For example, the AGICE 115 may determine that a full circle of images are captured if the predetermined angular displacement 155 is 5° and 72 pictures are captured around the target object. If the full circle of images are not captured, the step 730 is repeated.

If the full circle of images are captured, in step 740, a signal is transmitted to stop recording. For example, the AGICE 115 may transmit a signal to the image capturing device 105 to stop recording. In step 745, a background replacement model is applied to captured images. For example, the IPE 190 may apply the GANs to replace a background of the captured image using a background in the background database 275. In step 750, position labels are assigned to each of the captured images associated with the angular displacement of the corresponding image, and the method 700 ends. For example, the AGICE 115 may assign labels (e.g., front, back, side) to the captured images in the studio mode. For example, based on the labels, a user may customize the starting position (e.g., start from front of the vehicle 110) of a spin video generated by the captured images.

Figure 8:
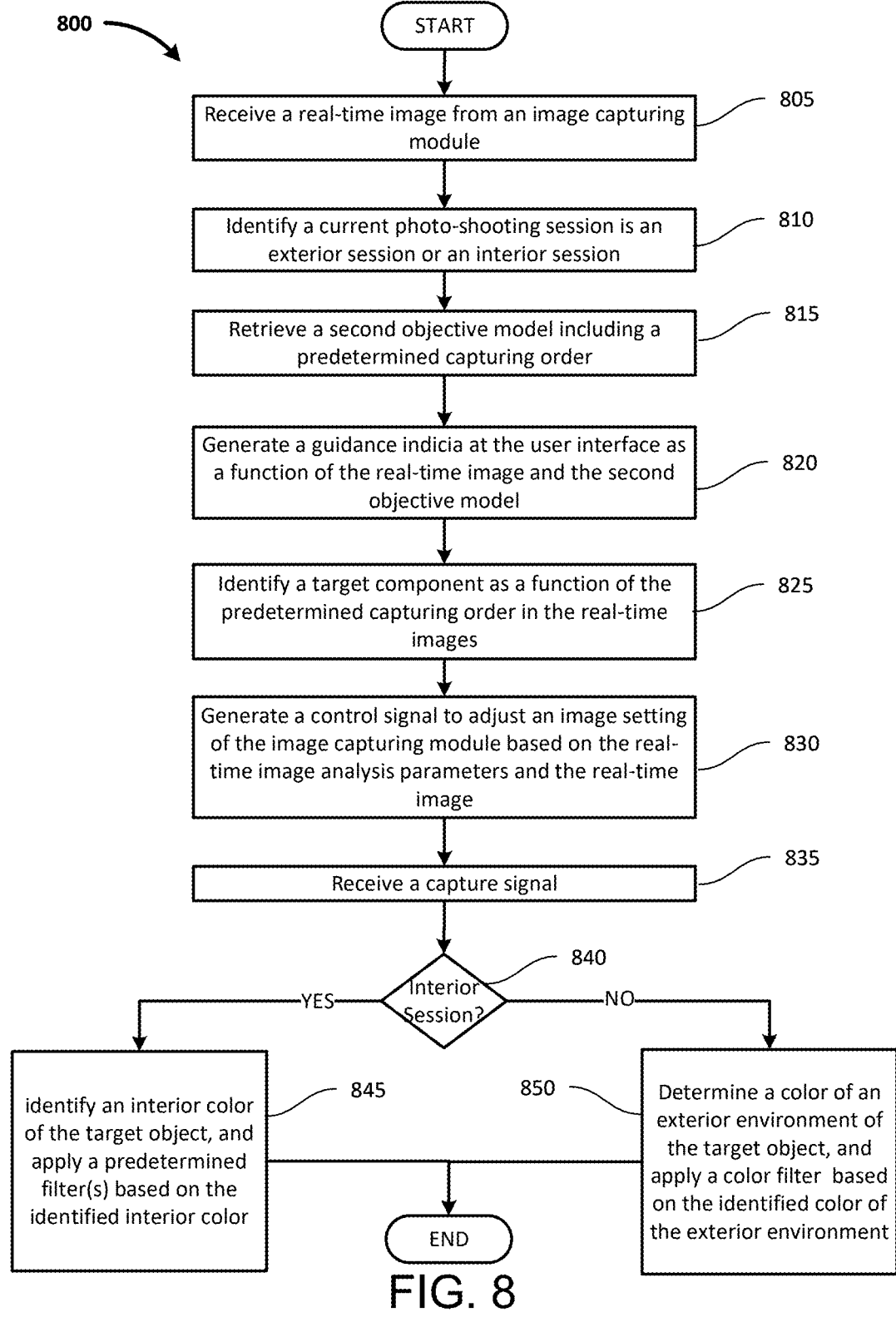
FIG. 8 depicts an exemplary guided capture mode image capturing method.

FIG. 8 depicts an exemplary guided capture mode image capturing method 800. For example, the method 800 may be performed in the step 635 as described with reference to FIG. 6. The method 800 begins in step 805 when a real-time image is received from an image capturing module. For example, the image capturing device 105 may capture continuously a stream of real-time images. Next, in step 810, a current photo-shooting session is determined to be an exterior session or an interior session. For example, the AGICE 115 may use the SSE 240 to determine whether a current photo-shooting session is an exterior session or an interior session. In step 815, a second objective is retrieved. For example, the second objective model 165 may be configured to identify components of a target object. For example, the second objective model 165 may include the capture sequence database 270 that may specify an order of target components to be captured in the current photo-shooting session.

After retrieving the second objective mode, a guidance indicia is generated at the user interface as a function of the real-time image and the second objective model in step 820. For example, when the capture sequence database 270 may specify that a front wheel is to be captured, the user interface 400 may be displayed. In step 825, a target component is identified as a function of the predetermined capturing order in the real-time images. For example, the AGICE 115 may use the classifier(s) 170 to identify a target component indicated in the capture sequence database 270 based on a received preview image from the image capturing device 105. Next, in step 830 a control signal is generated to adjust an image setting of the image capturing module based on the real-time image analysis parameters and the real-time image. For example, the AGICE 115 may generate a control signal to adjust image settings (e.g., white balance and color saturation) based on the ISPs 265 and identified components using the classifier(s) 170.

In step 835, a capture signal is received. For example, the AGICE 115 may receive the capture signal from the start capture button 310. For example, the AGICE 115 may receive the capture signal from the trigger 505. In a decision point 840, it is determined whether it is an interior session.

If it is an interior session, in step 845, an interior color of the target object is identified, and a predetermined filter(s) is applied based on the identified interior color, and the method 800 ends. For example, the AGICE 115 may counteract yellowness caused by auto white balance of the image capturing device 105. For example, the AGICE 115 may use the classifier(s) 170 to detect a color of the interior seats. Based on the detected color, the AGICE 115 may automatically apply an image filter (e.g., from the enhancement filters 280) to advantageously complement and accentuate interior aesthetics of the vehicle 110. If it is an exterior session, in step 850, a color of an exterior environment of the target object is determined, and a color filter is applied based on the identified color of the exterior environment, and the method 800 ends. For example, the color filter may include a white balance filter.

Although various embodiments have been described with reference to the figures, other embodiments are possible. For example, the AGICE 115 may be applied to capture images of other merchandise to generate standardized image profiles for marketing. For example, a target object may be a building (e.g., a house, a hotel room, a trailer home). For example, a target object may be clothing (e.g., a jacket, a dress, a trench-coat). For example, a target object may be a boat. For example, a target object may include an aircraft. For example, a target object may include equipment (e.g., medical equipment, machinery, home appliances).

In various implementations, the methods (e.g., the methods 600, 700, 800), and/or the systems (e.g., the AGICE 115) may be implemented in a computer program product. In various implementations, the methods (e.g., the methods 600, 700, 800), and/or the systems (e.g., the AGICE 115) may be implemented in a computer-implemented method.

Although an exemplary system has been described with reference to FIG. 1, other implementations may be deployed in other industrial, scientific, medical, commercial, and/or residential applications.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device. The display device may, for example, include an LED (light-emitting diode) display. In some implementations, a display device may, for example, include a CRT (cathode ray tube). In some implementations, a display device may include, for example, an LCD (liquid crystal display). A display device (e.g., monitor) may, for example, be used for displaying information to the user. Some implementations may, for example, include a keyboard and/or pointing device (e.g., mouse, trackpad, trackball, joystick), such as by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, an image generation system may, for example, include an image capturing module configured to continuously capture a real-time image; a data store that may, for example, include a program of instructions that may, for example, include an image processing engine configured to generate real-time image analysis parameters as a function of the real-time image, and an image standard profile comprising image enhancement filters.

The image generation system may, for example, includes a user interface operably coupled to the image capturing module, wherein the user interface may, for example, be configured to display an interface including the real-time image; and, a processor operably coupled to the data store such that, when the processor executes the program of instructions, the processor causes operations to be performed to automatically capture and standardized images of a target object based on the real-time image analysis parameters.

The operations may, for example, include: receive a selection signal from the user interface indicating a mode of a photo-shooting session comprising a studio mode and a guided capturing mode, wherein: in the studio mode, perform studio operations to automatically generate a 360° image of the target object, the studio operations that may, for example, retrieve, from a first data store, a first objective model comprising predetermined angular intervals; retrieve a start recording signal; generate an angular displacement of the image capturing module; and, transmit periodic signals to the image capturing module to capture a plurality of images of the target object as a function of the angular displacement of the image capturing module and the predetermined angular intervals such that a plurality of images are taken 360° around the target object; in the guided capture mode, perform guided capture operations to generate guidance indicia at the user interface to generate a predetermined sequence of photos for the target object, wherein the guided capture operations may, for example, include: determine whether a current photo-shooting session is an exterior session or an interior session; retrieve, from a second data store, a second objective model that may, for example, include a pixel segmentation model configured to identify components of the target object, and a predetermined capturing order of target components of the target object for the current photo-shooting session; interactively generate a guidance indicia at the user interface as a function of the real-time image and the second objective model; identify a target component as a function of the predetermined capturing order in the real-time images; and, generate a control signal to adjust an image setting of the image capturing module based on the real-time image analysis parameters and the real-time image; and, apply image adjustments based on the image standard profile, such that the images captured in the studio mode and the guided capture mode may, for example, be captured according to a predetermined image standard profile.

The image generation system may, for example, further include a gyro-sensor configured to measure an angular information of the image capturing module, wherein the image processing engine may, for example, be configured to generate the angular displacement of the image capturing module based on the measured angular information, such that the plurality of images may, for example, be captured based on an angular displacement between a previously captured image and a current image.

The image generation system may, for example, further include a mounting device that may, for example, include a first coupling element configured to releasably couple to the image capturing module, a second coupling element configured to releasably couple to a structure, and a trigger interface, wherein: in the studio mode, the mounting device is mounted on a stable structure such that external disturbance in image capturing is reduced, and, in the guided capturing mode, the mounting device transmits a capture signal to the image when the trigger interface is triggered.

The image generation system may, for example, include, in the studio mode, the studio operations that may, for example, further include: detect the target object; generate a guidance at the user interface to adjust a position of the target object in an image frame; assign a label to a captured image associated with the angular displacement of the captured image; and, generate a warning at the user interface when an external disturbance is above a threshold.

The image generation system may, for example, apply an image adjustment that may, for example, include in the interior session, identify an interior color of the target object, and apply a predetermined filter(s) based on the identified interior color, and, in the exterior session, determine a color of an exterior environment of the target object, and apply a color filter that may, for example, include a white balance filter based on the identified color of the exterior environment.

The image generation system may, for example, include the image processing engine further that may, for example, include a background replacement model configured to selectively replace a background of a captured image.

The image generation system may, for example, generate a control signal to adjust an image setting of the image capturing module that may, for example, automatically adjusts a zoom setting of the image capturing module to focus on the target component.

The image generation system may, for example, include the guidance indicia that may, for example, include an instruction message and a guidance image.

In an illustrative aspect, a computer program product may, for example, include a program of instructions tangibly embodied on a computer readable medium wherein when the instructions are executed on a processor, the processor causes operations to be performed to automatically capture and standardize images of a target object based on real-time image analysis parameters, the operations that may, for example, include: receive, from a user interface of an image capturing module, a selection signal indicating an operation mode that may, for example, include a studio mode and a guided capturing mode; retrieve, from a first data store on the image capturing module, an image standard profile comprising image enhancement filters; receive, from an image capturing module, a signal comprising continuous stream of images; continuously update real-time image analysis parameters that may, for example, include a position of the image capturing module and image settings as a function of the received images; in the studio mode, perform studio operations to automatically generate a 360° image of the target object, the studio operations that may, for example, include: receive a start recording signal; and, generate a plurality of images taken 360° around the target object; in the guided capture mode, perform guided capture operations to generate guidance indicia at the user interface to generate a predetermined sequence of photos for the target object, wherein the guided capture operations that may, for example: determine whether a current photo-shooting session is an exterior session or an interior session; retrieve, from a second data store, a first objective model that may, for example, include a pixel segmentation model configured to identify components of the target object, and a predetermined capturing order of target components of the target object for the current photo-shooting session; interactively generate a guidance indicia at the user interface as a function of the real-time image and the second objective model; identify a target component as a function of the predetermined capturing order in the real-time images; and, generate a control signal to adjust an image setting of the image capturing module based on the real-time image analysis parameters and the real-time image; apply image adjustments based on the image standard profile, such that the images captured in the studio mode and the guided capture mode that may, for example, be captured according to a predetermined image standard profile.

The computer program may, for example, in the studio mode, the studio operations further: retrieve, from a third data store, a second objective model comprising predetermined angular intervals; generate an angular displacement of the image capturing module based on the real-time image analysis parameters comprising an orientation of the image capturing module; and, transmit periodic signals to the image capturing module to capture the plurality of images of the target object as a function of the angular displacement of the image capturing module and the predetermined angular intervals.

The computer program product may, for example, include the angular displacement of the image capturing module is received from a gyro-sensor.

The computer program product may, for example, in the studio mode, the studio operations further including: detect the target object; generate a guidance at the user interface to adjust a position of the target object in an image frame; automatically generate a signal indicating a full circle is completed, and, generate a warning at the user interface when an external disturbance is above a threshold.

The computer program product may, for example, apply image adjustment including, in the interior session, identify an interior color of the target object, and apply a predetermined filter(s) based on the identified interior color, and, in the exterior session, determine a color of an exterior environment of the target object, and apply a color filter that may, for example, include a white balance filter based on the identified color of the exterior environment.

The computer program product may, for example, include the operations that further may, for example, include: retrieve a third objective model, from a third data store, comprising a background replacement model; and, apply the background replacement model to selectively replace a background of a captured image.

The computer program product may, for example, generate the control signal to adjust an image setting of the image capturing module comprises automatically adjusts a zoom level of the image capturing module to focus on the target component.

The computer program may, for example, include the guidance indicia that may, for example, include an instruction message and a guidance image.

In an illustrative aspect, a computer-implemented method performed by at least one processor to automatically capture and standardized images of a target object, the method may, for example: receive, from a user interface of an image capturing module, a selection signal indicating an operation mode that may, for example, include a studio mode and a guided capturing mode; retrieve, from a first data store on the image capturing module, an image standard profile that may, for example, include image enhancement filters; receive, from an image capturing module, a signal comprising continuous stream of images; continuously update real-time image analysis parameters that may, for example, include a position of the image capturing module and image settings as a function of the received images; in the studio mode, performs studio operations to automatically generate a 360° image of the target object, the studio operations that may, for example, include: retrieve, from a second data store, a first objective model that may, for example, include predetermined angular intervals; generate an angular displacement of the image capturing module based on an angular information received from a gyro-sensor; and, transmit periodic signals to the image capturing module to capture a plurality of images of the target object as a function of the angular displacement of the image capturing module and the predetermined angular intervals such that a plurality of images are taken 360° around the target object; and, in the guided capture mode, the guided capture operations that, may, for example, determine whether a current photo-shooting session is an exterior session or an interior session; retrieve, from a third data store, a second objective model comprising a pixel segmentation model configured to identify components of the target object based on, and a predetermined capturing order of target components of the target object for the current photo-shooting session; interactively generate a guidance indicia at the user interface as a function of the real-time image and the second objective model; identify a target component as a function of the predetermined capturing order in the real-time images; and, generate a control signal to adjust an image setting of the image capturing module based on the real-time image analysis parameters and the real-time image; and, apply image adjustments based on the image standard profile, such that the images captured in the studio mode and the guided capture mode that may, for example, captured according to a predetermined image standard profile.

The computer-implemented method may, for example, include in the studio mode, the studio operations which may, for example, further: detect the target object; generate a guidance at the user interface to adjust a position of the target object in an image frame; automatically generate a signal indicating a full circle is completed, and, generate a warning to the user when an external disturbance that may, for example, be above a threshold.

The computer-implemented method may, for example, apply image adjustment that may, for example, include, in the interior session, identify an interior color of the target object, and apply a predetermined filter(s) based on the identified interior color, and, in the exterior session, determine a color of an exterior environment of the target object, and apply a color filter comprising a white balance filter based on the identified color of the exterior environment.

The computer-implemented method may, for example, further apply a background replacement model configured to selectively replace a background to images captured in the studio mode.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An image generation system comprising:
   an image capturing module configured to continuously capture a real-time image;
   a data store comprising a program of instructions comprising an image processing engine configured to generate real-time image analysis parameters as a function of the real-time image, and an image standard profile comprising image enhancement filters;
   a user interface operably coupled to the image capturing module, wherein the user interface is configured to display an interface comprising the real-time image; and,
   a processor operably coupled to the data store such that, when the processor executes the program of instructions, the processor causes operations to be performed to automatically capture and standardized images of a target object based on the real-time image analysis parameters, the operations comprising:
      receive a selection signal from the user interface indicating a mode of a photo-shooting session comprising a studio mode and a guided capturing mode, wherein:
      in the studio mode, perform studio operations to automatically generate a 360° image of the target object, the studio operations comprising:
         retrieve, from a first data store, a first objective model comprising predetermined angular intervals;
         receive a start recording signal;
         generate an angular displacement of the image capturing module; and,
         transmit periodic signals to the image capturing module to capture a plurality of images of the target object as a function of the angular displacement of the image capturing module and the predetermined angular intervals such that a plurality of images are taken 360° around the target object;
      in the guided capture mode, perform guided capture operations to generate guidance indicia at the user interface to generate a predetermined sequence of photos for the target object, wherein the guided capture operations comprise:
         determine whether a current photo-shooting session is an exterior session or an interior session;
         retrieve, from a second data store, a second objective model comprising a pixel segmentation model configured to identify components of the target object, and a predetermined capturing order of target components of the target object for the current photo-shooting session;
         interactively generate a guidance indicia at the user interface as a function of the real-time image and the second objective model;
         identify a target component as a function of the predetermined capturing order in the real-time images; and,
         generate a control signal to adjust an image setting of the image capturing module based on the real-time image analysis parameters and the real-time image; and,
      apply image adjustments based on the image standard profile, such that the images captured in the studio mode and the guided capture mode are captured according to a predetermined image standard profile.

2. The image generation system of claim 1, further comprising a gyro-sensor configured to measure an angular information of the image capturing module, wherein the image processing engine is configured to generate the angular displacement of the image capturing module based on the measured angular information, such that the plurality of images are captured based on an angular displacement between a previously captured image and a current image.

3. The image generation system of claim 1, further comprising a mounting device comprising a first coupling element configured to releasably couple to the image capturing module, a second coupling element configured to releasably couple to a structure, and a trigger interface, wherein:
   in the studio mode, the mounting device is mounted on a stable structure such that external disturbance in image capturing is reduced, and,
   in the guided capturing mode, the mounting device transmits a capture signal to the image when the trigger interface is triggered.

4. The image generation system of claim 1, wherein, in the studio mode, the studio operations further comprising:
   detect the target object;
   generate a guidance at the user interface to adjust a position of the target object in an image frame;
   assign a label to a captured image associated with the angular displacement of the captured image; and,
   generate a warning at the user interface when an external disturbance is above a threshold.

5. The image generation system of claim 1, wherein apply image adjustment comprises,
   in the interior session, identify an interior color of the target object, and apply a predetermined filter(s) based on the identified interior color, and,
   in the exterior session, determine a color of an exterior environment of the target object, and apply a color filter comprising a white balance filter based on the identified color of the exterior environment.

6. The image generation system of claim 1, wherein the image processing engine further comprises a background replacement model configured to selectively replace a background of a captured image.

7. The image generation system of claim 1, wherein generate a control signal to adjust an image setting of the image capturing module comprises automatically adjusts a zoom setting of the image capturing module to focus on the target component.

8. The image generation system of claim 1, wherein the guidance indicia comprises an instruction message and a guidance image.

9. A computer program product comprising:

a program of instructions tangibly embodied on a computer readable medium wherein when the instructions are executed on a processor, the processor causes operations to be performed to automatically capture and standardize images of a target object based on real-time image analysis parameters, the operations comprising:

receive, from a user interface of an image capturing module, a selection signal indicating an operation mode comprising a studio mode and a guided capturing mode;

retrieve, from a first data store on the image capturing module, an image standard profile comprising image enhancement filters;

receive, from an image capturing module, a signal comprising continuous stream of images;

continuously update real-time image analysis parameters comprising a position of the image capturing module and image settings as a function of the received images;

in the studio mode, perform studio operations to automatically generate a 360° image of the target object, the studio operations comprising:

receive a start recording signal; and, generate a plurality of images taken 360° around the target object;

in the guided capture mode, perform guided capture operations to generate guidance indicia at the user interface to generate a predetermined sequence of photos for the target object, wherein the guided capture operations comprise:

determine whether a current photo-shooting session is an exterior session or an interior session;

retrieve, from a second data store, a first objective model comprising a pixel segmentation model configured to identify components of the target object, and a predetermined capturing order of target components of the target object for the current photo-shooting session;

interactively generate a guidance indicia at the user interface as a function of the real-time image and the second objective model;

identify a target component as a function of the predetermined capturing order in the real-time images; and, generate a control signal to adjust an image setting of the image capturing module based on the real-time image analysis parameters and the real-time image;

apply image adjustments based on the image standard profile, such that the images captured in the studio mode and the guided capture mode are captured according to a predetermined image standard profile.

10. The computer program product of claim 9, wherein, in the studio mode, the studio operations further comprising:

retrieve, from a third data store, a second objective model comprising predetermined angular intervals;

generate an angular displacement of the image capturing module based on the real-time image analysis parameters comprising an orientation of the image capturing module; and, transmit periodic signals to the image capturing module to capture the plurality of images of the target object as a function of the angular displacement of the image capturing module and the predetermined angular intervals.

11. The computer program product of claim 10, wherein the angular displacement of the image capturing module is received from a gyro-sensor.

12. The computer program product of claim 10, wherein, in the studio mode, the studio operations further comprising:

detect the target object;

generate a guidance at the user interface to adjust a position of the target object in an image frame;

automatically generate a signal indicating a full circle is completed, and, generate a warning at the user interface when an external disturbance is above a threshold.

13. The computer program product of claim 9, wherein apply image adjustment comprises, in the interior session, identify an interior color of the target object, and apply a predetermined filter(s) based on the identified interior color, and, in the exterior session, determine a color of an exterior environment of the target object, and apply a color filter comprising a white balance filter based on the identified color of the exterior environment.

14. The computer program product of claim 9, wherein the operations further comprising:

retrieve a third objective model, from a third data store, comprising a background replacement model; and, apply the background replacement model to selectively replace a background of a captured image.

15. The computer program product of claim 9, wherein generate the control signal to adjust an image setting of the image capturing module comprises automatically adjusts a zoom level of the image capturing module to focus on the target component.

16. The computer program product of claim 9, wherein the guidance indicia comprises an instruction message and a guidance image.

17. A computer-implemented method performed by at least one processor to automatically capture and standardized images of a target object, the method comprising:

receive, from a user interface of an image capturing module, a selection signal indicating an operation mode comprising a studio mode and a guided capturing mode;

retrieve, from a first data store on the image capturing module, an image standard profile comprising image enhancement filters;

receive, from an image capturing module, a signal comprising continuous stream of images;

continuously update real-time image analysis parameters comprising a position of the image capturing module and image settings as a function of the received images;

in the studio mode, performs studio operations to automatically generate a 360° image of the target object, the studio operations comprising:

retrieve, from a second data store, a first objective model comprising predetermined angular intervals;

generate an angular displacement of the image capturing module based on an angular information received from a gyro-sensor; and, transmit periodic signals to the image capturing module to capture a plurality of images of the target object as a function of the angular displacement of the image capturing module and the predetermined angular intervals such that a plurality of images are taken 360° around the target object; and, in the guided capture mode, the guided capture operations comprising:

determine whether a current photo-shooting session is an exterior session or an interior session;

retrieve, from a third data store, a second objective model comprising a pixel segmentation model configured to identify components of the target object based on, and a predetermined capturing order of target components of the target object for the current photo-shooting session;

interactively generate a guidance indicia at the user interface as a function of the real-time image and the second objective model;

identify a target component as a function of the predetermined capturing order in the real-time images; and, generate a control signal to adjust an image setting of the image capturing module based on the real-time image analysis parameters and the real-time image; and, apply image adjustments based on the image standard profile, such that the images captured in the studio mode and the guided capture mode are captured according to a predetermined image standard profile.

18. The computer-implemented method of claim 17, wherein, in the studio mode, the studio operations further comprise:

detect the target object;

generate a guidance at the user interface to adjust a position of the target object in an image frame;

automatically generate a signal indicating a full circle is completed, and, generate a warning to the user when an external disturbance is above a threshold.

19. The computer-implemented method of claim 17, wherein apply image adjustment comprises, in the interior session, identify an interior color of the target object, and apply a predetermined filter(s) based on the identified interior color, and, in the exterior session, determine a color of an exterior environment of the target object, and apply a color filter comprising a white balance filter based on the identified color of the exterior environment.

20. The computer-implemented method of claim 17, further comprising apply a background replacement model configured to selectively replace a background to images captured in the studio mode.

\* \* \* \* \*